June 30, 1970     R. A. BARKER     3,518,606

IGNITION CABLE WITH TERMINAL CONSTRUCTION

Filed June 27, 1968

INVENTOR.
ROBERT A. BARKER
BY
*L Henry Stoltenberg*
ATTORNEY

United States Patent Office 3,518,606
Patented June 30, 1970

3,518,606
IGNITION CABLE WITH TERMINAL CONSTRUCTION
Robert A. Barker, Port Huron, Mich., assignor to Eltra Corporation, Toledo, Ohio
Filed June 27, 1968, Ser. No. 740,732
Int. Cl. H01c *3/00, 1/06, 1/16*
U.S. Cl. 338—270                                     7 Claims

ABSTRACT OF THE DISCLOSURE

A method and means for connecting a resistance wire wound ignition cable to a terminal which is suitable for mass production which provides an encasing for the wound conductor of elastomeric or polymeric conducting material covered in turn with a release agent to allow ready removal of the outer insulating cover on the production line, the uncovered portion being bent back over the insulating cover and clamped against the insulating cover by a terminal ferrule.

---

Resistance cables for use in ignition systems for automotive vehicles for the purpose of reducing radiated emanations disruptive to radio and television and other electronic equipment transmission have long been known and used in the prior art. These cables may be made in several forms, including resistive central cores of fiber glass or other fibers such as linen or the like which are saturated with conductive material such as graphite, or they may be made with a flexible central core of fibers such as glass or linen held together by a binder of elastomeric or polymeric material around which is wound a very fine resistance wire such as Monel, nickel-chrome alloys, stainless steel and others to form a cylindrical flexible conductor having the desired electrical resistance necessary to damp out the oscillations in the ignition circuit which give rise to radiated emanations.

These wire wound resistance cables have long been used in the commercial field but have not gone into extensive use due to the problems encountered in their production especially when the resistance cable is to be mass produced. Generally speaking, the major problems have been encountered on the mass production line in attaching the terminals to the ends of such a cable so that the cable may conveniently be connected with the ignition circuit of an automotive vehicle. When the insulating cover is removed from the wound core, the fine resistance wire has a tendency to unravel and become unmanageable for an operator, so that difficulty of making the terminal connection is had even with manual operation, let alone on an automatic machine on a mass production line, where it becomes utterly impracticable.

It is a principal object of this invention to provide a method and means for producing a wire-wound high-resistance and/or inductance ignition cable for use in the ignition system of an automotive vehicle, which is suitable for production on automatic machines on a mass production line.

It is a further object of the invention to provide a flexible wire-wound core for an ignition cable having high resistance and/or inductance for use in automotive vehicles for damping disturbing radiated oscillations, which is stable from a resistance point of view and mechanically strong when subjected to abuse by mechanics in the service field.

It is a further object of this invention to provide an encasement of elastometric or polymeric material for a wire-wound core of a high-resistance and/or inductance ignition cable which holds the parts together mechanically to prevent unraveling and to give mechanical strength and also provides a means for allowing stripping of the outer insulating cover from the core when a releasing agent is applied to the outer surface of the core.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

FIG. 2 is a perspective view of a portion of the cable during an intermediate step of manufacture, and FIG. 3 is a perspective view of the end of the completed cable with the outer insulating cover removed preparatory to applying of the terminal.

Figure 1:
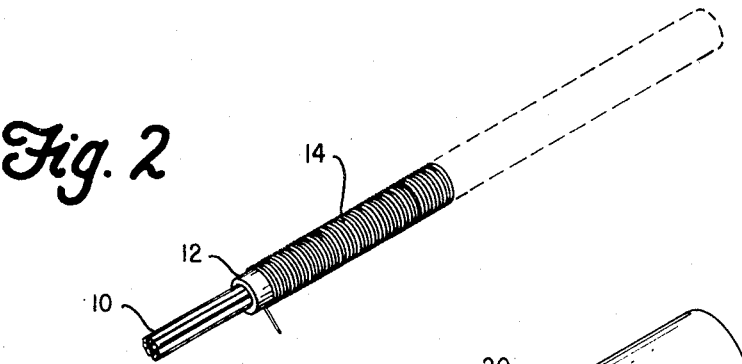
FIG. 1 is an elevational view partly in section of the ignition cable incorporating the invention showing the terminal in position on the cable end.
Figure 1:
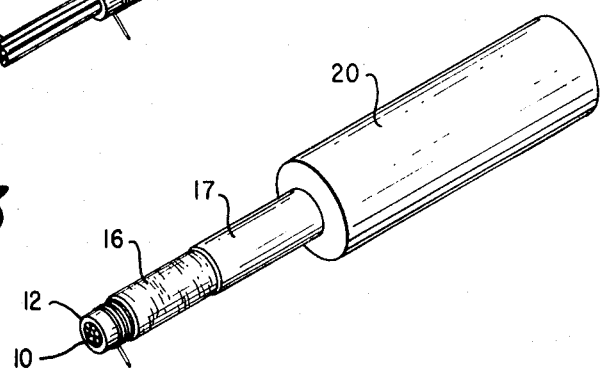
Figure 1:
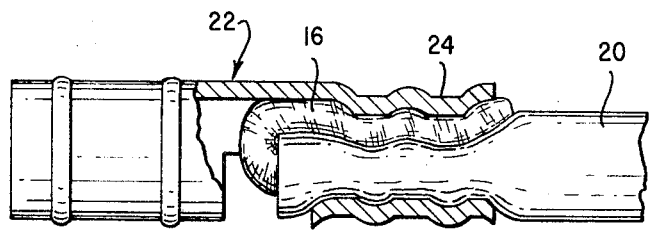

Referring to the drawings, particularly to FIG. 2, a central core 10 of fibrous insulating material is shown which may consist of fiber glass or other fibrous material such as linen, polyester, polyethylene, polypropolene and the like. The core can be made of separate strands wound together or it can be made as a cord, which preferably has a diameter of 20 to 40 mils. In some instances it may be desirable to cover the strands or cord with a binding layer 12 including ferretic materials to give the core magnetic properties to increase the impedance of the final ignition cable. The core 10, coated with a layer 12 of approximately 15 mils of binding material such as elastomeric or polymeric materials in which ferretic materials may be added, may be stabilized, vulcanized or polymerized to a stable condition to thereby provide a flexible central core having a diameter from 60 to 70 mils.

The central core is then heliclaly wound with a layer 14 of resistance wire preferably a form of stainless steel such as "Monel" having a preferred diameter of 4 mils but it may vary from .003 to .010 inch in diameter. The spacing of the resistance wire on the core may be varied to vary the resistance of the completed cable.

The ignition current carried by the cable is conducted longitudinally along the resistnace wire helically wound on the core to obtain the highest resistance possible for the wire sizes under the winding conditions. When ferretic materials are used in the core, the impedance, that is, D.C. resistance plus A.C. inductive resistance of the cable must be given consideration.

After the layer 14 of helically wound resistance is placed in position on the central insulating core, a binding layer 16 of conducting material is positioned over the combined core and helically wound wire so that the two parts are permanently bonded together as a unit, which requires that the binding layer 16 attaches itself permanently to the core as well as incasing the individual turns of the helically wound layer 14. The binding layer 16 must also have a smooth outer surface of substantially cylindrical conformation to facilitate stripping operations as will appear hereinafter. The layer 16 may be either elastomeric or polymeric material which stabilizes into a flexible coating to allow binding of the completed cable. Resinous material such as an acrylic loaded with carbon or an elastomeric material loaded with graphite so as to be conducting may be used. These are well known in the art.

When the smooth binding layer 16 has been applied, the layer is stabilized to form a coating without bumps or bulges, which may preferably be done by a heat treatment depending on the material used. The coating has a further function in that it excludes air at the interface between the metal resistive conductor and the insulation, thereby preventing internal corona in the insulation at the metallic surface which could cut the insulation and eventually destroy its electrical properties.

Thereafter a release agent is applied in the form of a thin layer of graphite, which preferably is applied in a carrier of alcohol or water and dried. The layer is approximately .0001 inch in thickness and provides a releasing layer to prevent the bonding of an outer conventional insulating coating 20 to the outer smooth cylindrical surface of the binding layer 16. The conventional insulating coating 20 is usually rubber which is extruded over the core and vulcanized by the usual method and means well known in the art.

The steps for fabricating the resistive ignition cable hereinbefore described are all applicable to a production line using automatic machinery which allows the manufacture of the cable continuously in long runs so that the cost of manufacture of the cable is substantially reduced. The long runs of cable may be stored in appropriate spools for transportation to another production line where the original cable is cut into suitable lengths preparatory to attachment of terminal elements as shown in FIG. 1. It is, of course, obvious that the terminals may also be applied in the first production line if such is desirable.

With the fully insulated cable 20 in the form shown in FIG. 3, as it issues from the vulcanizer in long lengths, the cable is first cut into short lengths of predetermined dimension suitable for use as ignition leads in automotive vehicles, preparatory to the attachment of terminals 22, shown in FIG. 1. These terminals are attached to each end of the portion cut from long lengths of cable and may take many forms, but the main element of the terminal 22 comprises ferrule 24 which embraces the wire end in attached position as shown in FIG. 1. The remaining portions of the terminals are designed in a manner to best suit its application.

When the short length of cable is cut from the long strand, the outer insulative cover 20 is coextensive with the central core, and a portion of the outer cover 20 must be stripped in order to expose the end of the conductive central core as shown in FIG. 3. This cutting step for the outer cover does not disturb the inner conductor by limiting the cut to the releasing layer 17. The smooth outer contour of the binding layer 16 allows the tubular cut portion of the cover 20 to be slid longitudinally along the core layer 16 to be removed therefrom so as to expose the central conductive core. The exposed element of the central conductive core is then bent back over the outer surface of the insulating cover 20 and the ferrule 24 of the terminal 22 is crimped over the two portions to clamp them permanently together and at the same time provide a permanent electrical connection between the resistive wire layer 14 and the terminal 22. These steps are applicable to a mass production line which makes ignition cables of this resistive type commercially feasible.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In an ignition cable having a conventional outer insulating layer for use with internal combustion engines having a resistive conductive core with uniformly distributed resistance throughout its length to suppress radio and television interference created by high frequency oscillations, said resistance being in the form of a metallic conductor helically wound about a central core of nonconducting strands bonded together by elastomeric or polymeric materials, the improvement comprising a binding layer of flexible conducting material bonded to the surface of the central core and encasing the helically wound metallic wire to form a unitary conducting member with a smooth outer surface, a releasing layer of conducting material on the smooth outer surface of the binding layer between the conducting member and the conventional outer insulating layer, whereby the radial cutting of the outer insulating layer to the releasing layer at an end of a cable portion permits the cut portion of the insulating layer to be slid off the central conducting member to expose a predetermined length of an end portion of the conducting member preparatory to the attachment of a terminal.

2. The ignition cable defined in claim 1 further characterized by bending the end portion of the core back over the outer insulating cover and clamping a terminal ferrule over both to form a permanent electrical connection therebetween.

3. The ignition cable defined in claim 1 wherein the binding layer over the core and wire is made of conducting elastomeric material.

4. The ignition cable defined in claim 1 wherein the binding layer over the core and wire is made of conducting polymeric material.

5. The ignition cable defined in claim 1 wherein the releasing layer is graphite.

6. The ignition cable defined in claim 1 wherein the resistance wire is made of stainless steel.

7. The ignition cable defined in claim 1 wherein the central core includes ferretic materials.

References Cited

UNITED STATES PATENTS

| 1,281,218 | 10/1918 | Schwartz | 338—264 X |
|---|---|---|---|
| 1,697,406 | 1/1929 | Richter | 338—270 X |
| 2,425,032 | 8/1947 | Deyrup. | |
| 2,790,053 | 4/1957 | Peterson | 338—214 |
| 3,284,751 | 11/1966 | Barker | 338—214 X |

E. A. GOLDBERG, Primary Examiner

U.S. Cl. X.R.
338—66, 214, 332

Disclaimer and Dedication 3,518,606.—*Robert A. Barker*, Port Huron, Mich. IGNITION CABLE WITH TERMINAL CONSTRUCTION. Patent dated June 30, 1970. Disclaimer and dedication filed Oct. 13, 1972, by the assignee, *Eltra Corporation*.

Hereby disclaims and dedicates said patent to the Public.

[*Official Gazette February 5, 1974*]